(12) United States Patent
Choi et al.

(10) Patent No.: US 12,179,172 B2
(45) Date of Patent: *Dec. 31, 2024

(54) METHOD OF PREPARING SUPERABSORBENT POLYMER AND SUPERABSORBENT POLYMER

(71) Applicant: LG Chem, Ltd., Seoul (KR)

(72) Inventors: Yong Seok Choi, Daejeon (KR); Yeon Woo Hong, Daejeon (KR); Eunji Shin, Daejeon (KR); Taebin Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1125 days.

This patent is subject to a terminal disclaimer.

(21) Appl. No.: 16/968,784

(22) PCT Filed: Nov. 27, 2019

(86) PCT No.: PCT/KR2019/016486
§ 371 (c)(1),
(2) Date: Aug. 10, 2020

(87) PCT Pub. No.: WO2020/122471
PCT Pub. Date: Jun. 18, 2020

(65) Prior Publication Data
US 2020/0398251 A1 Dec. 24, 2020

(30) Foreign Application Priority Data

Dec. 11, 2018 (KR) .................. 10-2018-0158920
Nov. 25, 2019 (KR) .................. 10-2019-0152657

(51) Int. Cl.
*B01J 20/26* (2006.01)
*B01J 20/28* (2006.01)
(Continued)

(52) U.S. Cl.
CPC .......... *B01J 20/261* (2013.01); *B01J 20/267* (2013.01); *B01J 20/28016* (2013.01);
(Continued)

(58) Field of Classification Search
CPC .. B01J 20/261; B01J 20/267; B01J 20/28016; B01J 20/3021; B01J 2220/68; B29B 9/02;
(Continued)

(56) References Cited

U.S. PATENT DOCUMENTS

| | | | |
|---|---|---|---|
| 4,883,478 A | 11/1989 | Lerailler et al. | |
| 5,977,429 A | 11/1999 | Phillips et al. | |

(Continued)

FOREIGN PATENT DOCUMENTS

| | | |
|---|---|---|
| CN | 106795253 A | 5/2017 |
| CN | 107428949 A | 12/2017 |

(Continued)

OTHER PUBLICATIONS

Machine translation of WO2016200041A1 (Year: 2016).*

(Continued)

*Primary Examiner* — Alexandra M Moore
*Assistant Examiner* — Logan Edward Laclair
(74) *Attorney, Agent, or Firm* — Lerner David LLP (57) ABSTRACT

Provided are a superabsorbent polymer and a preparation method thereof. More particularly, provided are a superabsorbent polymer including a fine powder reassembly, wherein the superabsorbent polymer exhibits excellent absorption performances and absorption rate, and does not cause deterioration of physical properties such as water retention capacity (CRC) or absorbency under pressure (AUP), and a preparation method thereof.

6 Claims, 1 Drawing Sheet

(51) Int. Cl.

| | | |
|---|---|---|
| *B01J 20/30* | (2006.01) | |
| *B29B 9/02* | (2006.01) | |
| *B29B 9/14* | (2006.01) | |
| *C08F 2/10* | (2006.01) | |
| *C08F 2/50* | (2006.01) | |
| *C08F 220/06* | (2006.01) | |
| *C08F 222/10* | (2006.01) | |
| *C08K 3/30* | (2006.01) | |
| *C08K 5/5397* | (2006.01) | |
| *C08K 7/02* | (2006.01) | |
| *C08L 1/02* | (2006.01) | |
| *C08L 23/12* | (2006.01) | |
| *C08L 29/04* | (2006.01) | |
| *C08L 77/06* | (2006.01) | |

(52) U.S. Cl.
CPC ............ *B01J 20/3021* (2013.01); *B29B 9/02* (2013.01); *B29B 9/14* (2013.01); *C08F 2/10* (2013.01); *C08F 2/50* (2013.01); *C08F 220/06* (2013.01); *C08F 222/102* (2020.02); *C08K 3/30* (2013.01); *C08K 5/5397* (2013.01); *C08K 7/02* (2013.01); *B01J 2220/68* (2013.01); *C08K 2003/3045* (2013.01); *C08K 2201/004* (2013.01); *C08L 1/02* (2013.01); *C08L 23/12* (2013.01); *C08L 29/04* (2013.01); *C08L 77/06* (2013.01)

(58) Field of Classification Search
CPC ....... B29B 9/14; B29B 9/16; B29B 2009/125; B29B 9/12; C08F 2/10; C08F 2/50; C08F 220/06; C08F 222/102; C08K 3/30; C08K 5/5397; C08K 7/02; C08K 2003/3045; C08K 2201/004; C08L 1/02; C08L 23/12; C08L 29/04; C08L 77/06; C08L 33/02; C08L 97/02; C08L 101/14; C08J 2300/14; C08J 2333/02; C08J 3/075; C08J 3/12; C08J 3/245
See application file for complete search history.

(56) References Cited

U.S. PATENT DOCUMENTS

| | | | |
|---|---|---|---|
| 5,981,070 A | 11/1999 | Ishizaki et al. | |
| 6,323,252 B1 | 11/2001 | Gartner et al. | |
| 10,414,876 B2 * | 9/2019 | Jang | ........... C08J 3/245 |
| 2004/0071966 A1 | 4/2004 | Inger et al. | |
| 2009/0264845 A1 | 10/2009 | Himori et al. | |
| 2009/0318582 A1 | 12/2009 | Loesch et al. | |
| 2010/0234531 A1 | 9/2010 | Frank | |
| 2011/0180755 A1 | 7/2011 | Adachi et al. | |
| 2012/0058267 A1 | 3/2012 | Stueven et al. | |
| 2012/0184684 A1 | 7/2012 | Funk et al. | |
| 2012/0296297 A1 | 11/2012 | Di Cintio et al. | |
| 2013/0256593 A1 | 10/2013 | Herfert et al. | |
| 2014/0221948 A1 * | 8/2014 | Riesinger | ........... A61L 15/46 424/490 |
| 2015/0259522 A1 | 9/2015 | Lee et al. | |
| 2016/0045895 A1 | 2/2016 | Won et al. | |
| 2016/0280866 A1 | 9/2016 | Lee et al. | |
| 2016/0375171 A1 | 12/2016 | Omori et al. | |
| 2017/0166707 A1 | 6/2017 | Jang et al. | |
| 2017/0354952 A1 | 12/2017 | Kim et al. | |
| 2018/0001300 A1 | 1/2018 | Nakatsuru et al. | |
| 2018/0185820 A1 | 7/2018 | Tada et al. | |
| 2018/0265645 A1 | 9/2018 | Nam et al. | |
| 2018/0305503 A1 | 10/2018 | Lim et al. | |
| 2019/0010297 A1 | 1/2019 | Lee et al. | |
| 2020/0009529 A1 | 1/2020 | Nam et al. | |

FOREIGN PATENT DOCUMENTS

| | | | |
|---|---|---|---|
| EP | 0579764 A1 | 1/1994 | |
| EP | 0885917 A2 | 12/1998 | |
| EP | 0612533 B1 | 11/1999 | |
| EP | 0812873 B1 | 10/2003 | |
| EP | 0844270 B1 | 11/2004 | |
| EP | 2957576 A1 | 12/2015 | |
| EP | 3112022 A1 | 1/2017 | |
| EP | 3279238 A1 | 2/2018 | |
| EP | 3309192 A1 | 4/2018 | |
| EP | 3333198 A1 | 6/2018 | |
| JP | S59086657 A | 5/1984 | |
| JP | S61062463 A | 3/1986 | |
| JP | S63-063723 A | 3/1988 | |
| JP | H04119154 A | 4/1992 | |
| JP | H06245958 A | 9/1994 | |
| JP | H06507564 A | 9/1994 | |
| JP | H06298841 A | 10/1994 | |
| JP | H09239912 A | 9/1997 | |
| JP | H10045812 A | 2/1998 | |
| JP | H10204184 A | 8/1998 | |
| JP | 2004300425 A | 10/2004 | |
| JP | 2006063508 A | 3/2006 | |
| JP | 2006528708 A | 12/2006 | |
| JP | 3970818 B2 | 9/2007 | |
| JP | 2008018328 A | 1/2008 | |
| JP | 2009543921 A | 12/2009 | |
| JP | 2010017536 A | 1/2010 | |
| JP | 2012024683 A | 2/2012 | |
| JP | 2013034942 A | 2/2013 | |
| JP | 2013507466 A | 3/2013 | |
| JP | 2015001402 A | 1/2015 | |
| JP | 2017026621 A | 2/2017 | |
| JP | 2018047189 A | 3/2018 | |
| KR | 20000068290 A | 11/2000 | |
| KR | 20110111938 A | 10/2011 | |
| KR | 20130138851 A | 12/2013 | |
| KR | 20140063457 A | 5/2014 | |
| KR | 20140133470 A | 11/2014 | |
| KR | 20150032045 A | 3/2015 | |
| KR | 20150061270 A | 6/2015 | |
| KR | 20160144902 A * | 3/2016 | |
| KR | 20170132799 A * | 3/2016 | |
| KR | 20160148986 A | 12/2016 | |
| KR | 20170052480 A | 5/2017 | |
| KR | 20170103849 A | 9/2017 | |
| KR | 20170106154 A | 9/2017 | |
| KR | 20180040404 A | 4/2018 | |
| KR | 20180050145 A | 5/2018 | |
| WO | 87003208 A1 | 6/1987 | |
| WO | 9218171 A1 | 10/1992 | |
| WO | 1997003114 A1 | 1/1997 | |
| WO | 2002058841 A2 | 8/2002 | |
| WO | 2008110524 A1 | 9/2008 | |
| WO | 2009041727 A1 | 4/2009 | |
| WO | 2011040530 A1 | 4/2011 | |
| WO | WO-2016200041 A1 * | 12/2016 | ........... B01J 20/267 |

OTHER PUBLICATIONS

Extended European Search Report including Written Opinion for Application No. 19894696.4 dated Jul. 14, 2021, 7 pgs.
Third Party Observation for Application No. PCT/KR2019/016486 submitted Apr. 5, 2021, pp. 1-5.
JP Office Action dated Aug. 16, 2021, 7 pgs.
Extended European Search Report including Written Opinion for Application No. EP19895283.0 dated Feb. 5, 2021, 15 pgs.
Odian, George, "Principle of Polymerization." Second Edition, (Wiley, 1981), p. 203.
Schwalm, Reinhold, "UV Coatings: Basics, Recent Developments and New Applications." Elsevier Science, Dec. 21, 2006, p. 115.
International Search Report including Written Opinion for PCT/KR2019016486 mailed Mar. 17, 2020; 9 pages.
Search Report dated Sep. 22, 22 from Office Action for Chinese Application No. 201980010288 issued Sep. 28, 22. 2 pgs.
Third Party of Observation for European Patent Application No. 19895283.0 dated Oct. 21, 2022. 19 pgs.

(56) References Cited

OTHER PUBLICATIONS

Buchholz, F., et al., "Modern Superabsorbent Polymer Technology", WILEY-VCH (1998). 12 pgs.
Encyclopedic dictionary of chemistry Exhibit (Jul. 2005). 3 pgs.

* cited by examiner

METHOD OF PREPARING SUPERABSORBENT POLYMER AND SUPERABSORBENT POLYMER

CROSS-REFERENCE TO RELATED APPLICATIONS

The present application is a national phase entry under 35 U.S.C. § 371 of International Application No. PCT/KR2019/016486, filed Nov. 27, 2019, which claims priority from, Korean Patent Application Nos. 10-2018-0158920 filed on Dec. 11, 2018, and Korean Patent Application No. 10-2019-0152657, filed Nov. 25, 2019, the disclosures of which are hereby incorporated by reference herein in their entirety.

TECHNICAL FIELD

The present invention relates to a superabsorbent polymer and a preparation method thereof. More particularly, the present invention relates to a superabsorbent polymer including a fine powder reassembly, in which the superabsorbent polymer exhibits excellent absorption properties, and a preparation method thereof.

BACKGROUND ART

A superabsorbent polymer (SAP) is a synthetic polymeric material capable of absorbing moisture from 500 to 1000 times its own weight. Since such superabsorbent polymers started to be practically applied in sanitary products, now they have been widely used not only for hygiene products such as disposable diapers for children, etc., but also for water retaining soil products for gardening, water stop materials for the civil engineering and construction, sheets for raising seedling, fresh-keeping agents for food distribution fields, materials for poultice or the like.

The absorption mechanism of the superabsorbent polymer is controlled by an osmotic pressure due to a difference in electric attraction represented by charges of a polymer electrolyte, affinity between water and a polymer electrolyte, molecular expansion due to a repulsive force between polymer electrolyte ions, and interactions of expansion inhibition due to crosslinkages. Briefly, absorbability of the absorbent polymer depends on the aforementioned affinity and molecular expansion, and the absorption rate thereof is greatly affected by the osmotic pressure of the absorbent polymer itself.

Many studies have been conducted to improve the absorption rate of the superabsorbent polymer. For example, Korean Patent Publication No. 2014-0063457 describes a method of preparing a superabsorbent polymer, the method including the step of preparing a fine powder reassembly using only a fine powder and a base polymer without additives. However, there has been a problem in that physical properties of the fine powder reassembly are more deteriorated than those of the base polymer and the complicated process lowers efficiency.

PRIOR ART DOCUMENT

Patent Document 1: Korean Patent Publication No. 2014-0063457

DISCLOSURE

Technical Problem

To solve the above problems of the prior art, the present invention provides a superabsorbent polymer including a fine powder reassembly, which has an excellent absorption rate and does not cause deterioration of physical properties such as water retention capacity (CRC) or absorbency under pressure (AUP), and a preparation method thereof.

Technical Solution

To achieve the above object, the present invention provides a method of preparing a superabsorbent polymer, the method including the steps of:

performing thermal polymerization or photo-polymerization of a monomer composition including a water-soluble ethylenically unsaturated monomer and a polymerization initiator to prepare a water-containing gel polymer;

drying, pulverizing, and size-sorting the water-containing gel polymer to classify the water-containing gel polymer into a fine powder having a particle size of less than 150 µm and a normal particle having a particle size of 150 µm to 850 µm;

mixing one or more fibers of a fluff pulp and a synthetic polymeric fiber with the fine powder and water to prepare a fine powder aqueous solution; and stirring the fine powder aqueous solution to prepare a fine powder reassembly.

The fine powder aqueous solution may include the fiber in an amount of 1 part by weight or more to less than 20 parts by weight with respect to 100 parts by weight of the fine powder.

The fiber may have a length of 1 mm to 20 mm.

The fiber may have a width of 1 µm to 100 µm.

The synthetic polymeric fiber may be one or more selected from the group consisting of nylon, polypropylene, polyethylene, polyester, polyacrylonitrile, polyvinyl chloride, polyvinyl alcohol, polyacrylate, and acetate.

The fine powder aqueous solution may include water in an amount of 50 parts by weight to 150 parts by weight with respect to 100 parts by weight of the fine powder.

The preparation method of the present invention may further include the step of drying, pulverizing, and size-sorting the fine powder reassembly. In addition, the preparation method of the present invention may further include the step of surface-crosslinking the pulverized and size-sorted fine powder reassembly.

Further, the present invention provides a superabsorbent polymer prepared by the preparation method.

Specifically, the present invention provides a superabsorbent polymer including a fine powder reassembly which is reassembled by mixing a fine powder having a particle size of less than 150 µm among polymers obtained by polymerizing a water-soluble ethylenically unsaturated monomer including acidic groups, of which at least a part is neutralized; and one or more fibers of a fluff pulp and a synthetic polymeric fiber.

At least a portion of the fibers may be incorporated into the interior of the fine powder reassembly particle.

The fine powder reassembly may include the fiber in an amount of 1 part by weight or more to less than 20 parts by weight with respect to 100 parts by weight of the fine powder.

The superabsorbent polymer may have centrifugal retention capacity (CRC) of 30 g/g to 45 g/g, as measured in accordance with EDANA method WSP 241.3.

The superabsorbent polymer may have absorbency under load (AUL) at 0.3 psi of 25 g/g to 40 g/g, as measured in accordance with EDANA method WSP 242.3.

The superabsorbent polymer may have an absorption rate (vortex time) of 60 sec or less.

Effect of the Invention

According to a superabsorbent polymer and a preparation method thereof according to the present invention, it is possible to provide a high-quality superabsorbent polymer having excellent basic absorption performances while exhibiting a more improved absorption rate.

BEST MODE FOR CARRYING OUT THE INVENTION

Figure 1:
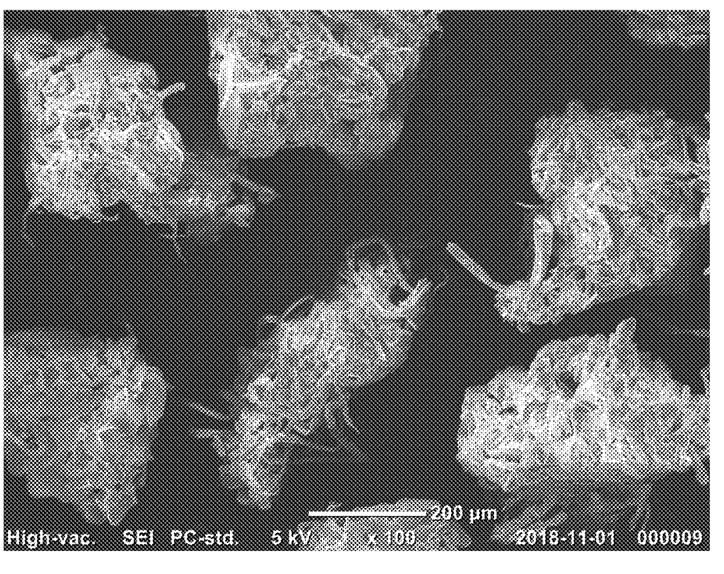
FIG. 1 is a scanning electron microscopy (SEM) image of a superabsorbent polymer prepared in Example 3.

The terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components, or combinations thereof beforehand.

The present invention may be variously modified and have various forms, and specific examples of the present invention are explained in this description. However, it is not intended to limit the present invention to the specific examples and it must be understood that the present invention includes every modifications, equivalents, or replacements included in the spirit and technical scope of the present invention.

Hereinafter, a superabsorbent polymer and a preparation method thereof will be described in more detail according to specific embodiments of the present invention.

A method of preparing a superabsorbent polymer according to one embodiment of the present invention may include the steps of: performing thermal polymerization or photo-polymerization of a monomer composition including a water-soluble ethylenically unsaturated monomer and a polymerization initiator to prepare a water-containing gel polymer; drying, pulverizing, and size-sorting the water-containing gel polymer to classify the water-containing gel polymer into a fine powder having a particle size of less than 150 μm and a normal particle having a particle size of 150 μm to 850 μm; mixing one or more fibers of a fluff pulp and a synthetic polymeric fiber with the fine powder and water to prepare a fine powder aqueous solution; and stirring the fine powder aqueous solution to prepare a fine powder reassembly.

For reference, as used herein, the "polymer" means a polymerized state of water-soluble ethylenically unsaturated monomers, and may encompass those of all water content ranges, particle size ranges, surface-crosslinked states or processed states. Among the polymers, those having a water content (moisture content) of about 40% by weight or more after being polymerized and before being dried may be designated as a water-containing gel polymer.

Further, among the polymers, a polymer having a particle size of less than 150 μm may be designated as a "fine powder". The fine powder may encompass those generated during all processes in the method of preparing the superabsorbent polymer, for example, a polymerization process, a drying process, a process of pulverizing the dried polymer, or a surface-crosslinking process.

Further, the "fine powder reassembly" means a particle having a particle size of 150 μm or more, in which the fine powder is aggregated, or a population of a plurality of the particles.

Further, the "superabsorbent polymer" means either the polymer itself depending on the context, or is used to encompass those made suitable for commercialization by an additional process, for example, surface crosslinking, reassembling of fine powder, drying, pulverizing, size-sorting, etc.

In the method of preparing a superabsorbent polymer of the present invention, thermal polymerization or photo-polymerization of a monomer composition including a water-soluble ethylenically unsaturated monomer and a polymerization initiator is first performed to form a water-containing gel polymer.

The monomer composition which is a raw material of the superabsorbent polymer includes the water-soluble ethylenically unsaturated monomer and the polymerization initiator.

As the water-soluble ethylenically unsaturated monomer, any monomer commonly used in the preparation of superabsorbent polymers may be without particular limitation. Here, any one or more monomers selected from the group consisting of anionic monomers and salts thereof, nonionic hydrophilic monomers, and amino group-containing unsaturated monomers and quaternarized products thereof may be used.

Specifically, one or more selected from the group consisting of anionic monomers such as (meth)acrylic acid, maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, and salts thereof; nonionic hydrophilic monomers such as (meth)acrylamide, N-substituted (meth)acrylate, 2-hydroxyethyl (meth)acrylate, 2-hydroxypropyl(meth)acrylate, methoxypolyethyleneglycol(meth)acrylate, or polyethyleneglycol (meth)acrylate; and amino group-containing unsaturated monomers such as (N,N)-dimethylaminoethyl(meth)acrylate or (N,N)-dimethylaminopropyl(meth)acrylamide, and quartenarized products thereof may be used.

More preferably, acrylic acid or a salt thereof, for example, acrylic acid or an alkali metal salt thereof such as a sodium salt thereof may be used. When these monomers are used, it is possible to prepare a superabsorbent polymer having more excellent physical properties. When an alkali metal salt of acrylic acid is used as a monomer, acrylic acid may be used after being neutralized with a basic compound such as caustic soda (NaOH).

A concentration of the water-soluble ethylenically unsaturated monomer may be about 20% by weight to about 60% by weight, preferably, about 40% by weight to about 50% by weight with respect to the monomer composition including raw materials of the superabsorbent polymer and solvents, and the concentration may be appropriately controlled by considering a polymerization time, reaction conditions, etc. If the concentration of the monomer is too low, the yield of the superabsorbent polymer may become low, and there may be a problem in terms of economic efficiency. On the contrary, if the concentration of the monomer is too high, there is a process problem that part of the monomers is precipitated, or pulverization efficiency is lowered upon pulverization of the polymerized water-containing gel polymer, and the physical properties of the superabsorbent polymer may be reduced.

As the polymerization initiator used during polymerization in the method of preparing the superabsorbent polymer of the present invention, those generally used in the preparation of superabsorbent polymers may be used without particular limitation.

Specifically, the polymerization initiator may be a thermal polymerization initiator or a photo-polymerization initiator by UV irradiation, depending on the polymerization method. However, even in the case of using the photo-polymerization method, since a certain amount of heat is generated by the ultraviolet irradiation or the like, and a certain degree of heat is also generated according to the progress of the exothermic polymerization reaction, a thermal polymerization initiator may be additionally included.

The photo-polymerization initiator may be used without limitation in view of constitution as long as it is a compound capable of forming a radical by light such as UV ray.

The photo-polymerization initiator may include, for example, one or more initiators selected from the group consisting of benzoin ether, dialkyl acetophenone, hydroxyl alkylketone, phenyl glyoxylate, benzyl dimethyl ketal, acyl phosphine, and α-aminoketone. Meanwhile, specific examples of the acyl phosphine may include commercially available lucirin TPO, namely, 2,4,6-trimethyl-benzoyl-trimethyl phosphine oxide. More various photo-polymerization initiators are well disclosed in "UV Coatings: Basics, Recent Developments and New Application (Elsevier, 2007)" written by Reinhold Schwalm, p 115, however, the photo-polymerization initiator is not limited to the above-described examples.

The photo-polymerization initiator may be included at a concentration of about 0.01% by weight to about 1.0% by weight with respect to the monomer composition. When the concentration of the photo-polymerization initiator is too low, the polymerization rate may become slow, and when the concentration of the photo-polymerization initiator is too high, a molecular weight of the superabsorbent polymer becomes small and its physical properties may become uneven.

Further, as the thermal polymerization initiator, one or more initiators selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4$)$_2S_2O_8$), etc., and examples of the azo-based initiator may include 2,2-azobis-(2-amidinopropane) dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, 4,4-azobis-(4-cyanovaleric acid), etc. More various thermal polymerization initiators are well disclosed in 'Principle of Polymerization (Wiley, 1981)' written by Odian, p 203, however, the thermal polymerization initiator is not limited to the above-described examples.

The thermal polymerization initiator may be included at a concentration of about 0.001% by weight to about 0.5% by weight with respect to the monomer composition. When the concentration of the thermal polymerization initiator is too low, additional thermal polymerization hardly occurs, and thus effects due to the addition of the thermal polymerization initiator may be insignificant, and when the concentration of the thermal polymerization initiator is too high, the molecular weight of the superabsorbent polymer becomes small and the physical properties may become uneven.

According to one embodiment of the present invention, the monomer composition may further include an internal crosslinking agent as a raw material of the superabsorbent polymer. As the internal crosslinking agent, a crosslinking agent having one or more functional groups reactable with a water-soluble substituent of the water-soluble ethylenically unsaturated monomer and one or more soluble ethylenically unsaturated groups; or a crosslinking agent having two or more functional groups reactable with a water-soluble substituent of the monomer and/or a water-soluble substituent formed by hydrolysis of the monomer may be used.

Specific examples of the internal crosslinking agent may include one or more selected from the group consisting of bisacrylamide having 8 to 12 carbon atoms, bismethacrylamide, poly(meth)acrylate of a polyol having 2 to 10 carbon atoms, or poly(meth)allyl ether of a polyol having 2 to 10 carbon atoms. More specific examples thereof may include one or more selected from the group consisting of N,N'-methylene bis(meth)acrylate, ethyleneoxy(meth)acrylate, polyethyleneoxy(meth)acrylate, propyleneoxy(meth)acrylate, glycerin diacrylate, glycerin triacrylate, trimethyloltriacrylate, triallylamine, triarylcyanurate, triallylisocyanate, polyethylene glycol, diethylene glycol, and propylene glycol.

The internal crosslinking agent may be included at a concentration of about 0.01% by weight to about 0.5% by weight with respect to the monomer composition, thereby crosslinking the polymerized polymer.

In the preparation method of the present invention, the monomer composition of the superabsorbent polymer may further include additives such as a thickener, a plasticizer, a preservation stabilizer, an antioxidant, etc., if necessary.

The raw materials such as the above-described water-soluble ethylenically unsaturated monomer, photo-polymerization initiator, thermal polymerization initiator, internal crosslinking agent, and additive may be prepared in the form of a solution in which the monomer composition is dissolved in a solvent.

As the solvent to be applicable, any solvent may be used without limitations in view of constitution as long as it is able to dissolve the above components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide may be used in combination.

The solvent may be included in a residual amount excluding the above-described components from the total weight of the monomer composition.

Meanwhile, the thermal polymerization or photo-polymerization of the monomer composition is not particularly limited in view of constitution, as long as it is a polymerization method commonly used.

Specifically, the polymerization method is largely classified into the thermal polymerization and the photo-polymerization according to a polymerization energy source. The thermal polymerization may be commonly carried out in a reactor like a kneader equipped with agitating spindles whereas the photo-polymerization may be carried out in a reactor equipped with a movable conveyor belt. The above-described polymerization method is an example only, and the present invention is not limited to the above-described polymerization methods.

For example, the water-containing gel polymer may be obtained by performing thermal polymerization while providing hot air to the above-described reactor like a kneader equipped with the agitating spindles or heating the reactor. The water-containing gel polymer may have a size of centimeters or millimeters when it is discharged from an outlet of the reactor, according to the type of agitating spindles equipped in the reactor. Specifically, the size of the obtained water-containing gel polymer may vary depending on a concentration of the monomer composition fed thereto, a feeding speed or the like, and the water-containing gel polymer having a weight average particle size of 2 mm to 50 mm may be generally obtained.

Further, as described above, when the photo-polymerization is carried out in a reactor equipped with a movable conveyor belt, the obtained water-containing gel polymer may be usually a sheet-like water-containing gel polymer having a width of the belt. In this case, the thickness of the polymer sheet may vary depending on the concentration of the monomer composition fed thereto and the feeding speed. Usually, it is preferable to supply the monomer composition so that a sheet-like polymer having a thickness of about 0.5 cm to about 5 cm may be obtained. When the monomer composition is supplied to such an extent that the thickness of the sheet-like polymer becomes too thin, it is undesirable because the production efficiency is low, and when the thickness of the sheet-like polymer is more than 5 cm, the polymerization reaction may not evenly occur over the entire thickness because of the excessive thickness.

The water-containing gel polymer obtained by the above-mentioned method may have a water content of about 40% by weight to about 80% by weight. Meanwhile, the "water content" as used herein means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer through infrared heating. At this time, the water content is measured under the drying conditions determined as follows: the drying temperature is increased from room temperature to about 180° C. and then the temperature is maintained at 180° C., and the total drying time is set to 20 minutes, including 5 minutes for the temperature rising step.

Next, the water-containing gel polymer is coarsely pulverized.

In this regard, a pulverizer used here is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter, but is not limited to the above-described examples.

In this regard, the coarse pulverization step may be carried out so that the particle diameter of the water-containing gel polymer becomes about 2 mm to about 20 mm.

Coarse pulverizing of the water-containing gel polymer into a particle diameter of less than 2 mm is not technically easy due to its high water content, and an agglomeration phenomenon between the pulverized particles may occur. Meanwhile, if the polymer is coarsely pulverized into a particle diameter of greater than 20 mm, the effect of increasing the efficiency in the subsequent drying step may be insignificant.

Next, the obtained water-containing gel polymer is dried.

The water-containing gel polymer coarsely pulverized as above or the water-containing gel polymer immediately after polymerization without the coarse pulverizing step is subjected to a drying step. In this regard, a drying temperature of the drying step may be about 150° C. to about 250° C. If the drying temperature is lower than 150° C., the drying time becomes too long and the physical properties of the final superabsorbent polymer may be deteriorated. If the drying temperature is higher than 250° C., only the polymer surface is excessively dried, and thus fine powder may be generated during the subsequent pulverization process and the physical properties of the super absorbent polymer finally formed may be deteriorated. Therefore, the drying may be performed at a temperature of about 150° C. to about 200° C., and more preferably at a temperature of about 160° C. to about 180° C.

Meanwhile, the drying step may be carried out for about 20 minutes to about 90 minutes, in consideration of the process efficiency, but is not limited thereto.

In the drying step, any drying method may be selected and used without limitation in view of constitution, as long as it is commonly used in the process of drying the water-containing gel polymer. Specifically, the drying step may be carried out by a method such as hot air supply, infrared irradiation, microwave irradiation or ultraviolet irradiation. When the drying step as above is finished, the water content of the polymer may be about 0.1% by weight to about 10% by weight.

Next, the dried mixture obtained through the drying step is pulverized.

The polymer powder obtained through the pulverizing step may have a particle diameter of about 150 μm to about 850 μm. Specific examples of a pulverizer that may be used to achieve the above particle diameter may include a pin mill, a hammer mill, a screw mill, a roll mill, a disc mill, a jog mill, etc., but the present invention is not limited thereto.

In order to manage the physical properties of the superabsorbent polymer powder that is finally commercialized after the pulverization step, the polymer powder obtained after the pulverization is generally size-sorted depending on the particle diameter. Preferably, the polymer powder is sorted into a polymer having a particle diameter of less than about 150 μm, a polymer having a particle diameter of about 150 μm to about 850 μm, and a polymer having a particle diameter of more than about 850 μm.

In the present invention, fine powder particles having a particle size of less than a predetermined particle size, i.e., a particle size of less than about 150 μm are referred to as a superabsorbent polymer fine powder, SAP fine powder, or fine powder (fines). Particles having a particle size of about 150 μm to about 850 μm are referred to as normal particles. The fine powder may be generated during the polymerization process, the drying process, or the pulverization step of the dried polymer. If the fine powder is included in final products, it is difficult to handle, and physical properties may be deteriorated, for example, a gel blocking phenomenon may occur, etc. Therefore, it is preferred to exclude the fine powder so as not to include the fine powder in the final polymer product or to reuse the fine powder to be normal particles.

In the present invention, the fine powder is aggregated to the size of the normal particles, thereby forming a fine powder reassembly of the superabsorbent polymer.

More specifically, the fine powder reassembling is performed by mixing one or more fibers of a fluff pulp and a synthetic polymeric fiber with the fine powder and water to prepare a fine powder aqueous solution, and then stirring the prepared fine powder aqueous solution to aggregate the above materials, thereby preparing the fine powder reassembly.

At this time, the fine powder may have a water content of 40% to 60%. As the water content of the fine powder is higher, the aggregation strength of the fine powder may increase. However, in the reassembly process, massive reassembly lumps or reassembly lumps (jelly balls) in a solidly aggregated state since the fine powder partially contain a large amount of moisture may occur, which may cause problems in operation of the subsequent pulverization process. In addition, when the water content of the fine powder is too low, the reassembly process is easy, but the aggregation strength is low, and thus the polymer is easily crushed again into fine powder after the reassembly. Therefore, it is preferable that the water content satisfies the above range.

The fluff pulp is a cellulose fluff pulp, and may be, but is not limited to, a wood fluff pulp such as coniferous kraft paper and broadleaf kraft pulp. Fluff pulp used in absorbent articles may be used without limitation.

The synthetic polymeric fiber may be one or more selected from the group consisting of nylon, polypropylene, polyethylene, polyester, polyacrylonitrile, polyvinyl chloride, polyvinyl alcohol, polyacrylate, and acetate. Since the synthetic polymeric fiber has excellent hygroscopic property, and a width or length of the fiber may be easily controlled, the control of physical properties of the superabsorbent polymer may be easy.

The fiber may preferably have a length of 1 mm to 20 mm. Further, the fiber may preferably have a width of 1 μm to 100 μm. If the length of the fiber is too short or the width of the fiber is too narrow, it is difficult to ensure the effect of improving the absorption rate of the fine powder reassembly. On the contrary, if the length of the fiber is too long or the width of the fiber is too wide, it is difficult to introduce the fibers into the fine powder reassembly.

In this aspect, the length of the fiber may be preferably 2 mm or more, or 3 mm or more, and 15 mm or less, or 10 mm or less. For example, fibers having a mean length of 3 mm to 10 mm in which the length of individual fibers satisfy the range of 1 mm to 20 mm may be preferably used. Here, the mean length of the fibers may be obtained by randomly selecting 100 fibers, measuring the lengths of the individual fibers, and calculating the average thereof.

Further, the width of the fiber may be 5 μm or more, or 10 μm or more, and 80 μm or less, or 50 μm or less.

In the step of forming the fine powder reassembly, the content of the fibers in the fine powder aqueous solution may be 1 part by weight or more, 2 parts by weight or more, or 5 parts by weight or more, and less than 20 parts by weight, 15 parts by weight or less, or 10 parts by weight or less with respect to 100 parts by weight of the fine powder. If the content of the fiber is less than 1 part by weight with respect to 100 parts by weight of the fine powder, it is not possible to secure the effect of improving the absorption rate of the fine powder reassembly due to fluff pulp. If the content of the fiber is 20 parts by weight or more with respect to 100 parts by weight of the fine powder, the absorption rate is improved, but basic absorption performances, such as water retention capacity, absorbency under load, etc. may be reduced.

Meanwhile, the fine powder aqueous solution includes water, and the content of water may be 50 parts by weight to 150 parts by weight, or 70 parts by weight to 150 parts by weight with respect to 100 parts by weight of the fine powder. If the content of water is more than 150 parts by weight with respect to 100 parts by weight of the fine powder, the reassembly lumps may be excessively large or jelly balls may occur, as described above. If the content of water is less than 50 parts by weight with respect to 100 parts by weight of the fine powder, the aggregation strength of the reassembly to be prepared may reduce.

In one embodiment, the fine powder aqueous solution may be prepared by first dry-mixing the fine powder and the fibers before adding water, and then adding water and stirring the mixture. As described, when water is added after dry-mixing the fine powder and the fibers, it is preferable in that the fibers may be more uniformly dispersed in the fine powder reassembly.

Next, the prepared fine powder aqueous solution is mixed to form the fine powder reassembly. A method of mixing the fine powder aqueous solution is not particularly limited, but may be, for example, performed by stirring at a temperature of 25° C. to 100° C. and a speed of 200 rpm to 2000 rpm for 5 sec to 60 sec.

According to one embodiment of the present invention, the step of drying, pulverizing, and size-sorting the obtained fine powder reassembly may be further included.

The step of drying the fine powder reassembly may be performed at a temperature of 150° C. to 250° C. for 20 min to 90 min. Further, a means for raising the temperature for drying is not particularly limited in view of constitution. Specifically, a heating medium may be supplied or heating may be directly performed by means such as electricity, but the present invention is not limited to the above-described examples. Specifically, applicable heat sources may include steam, electricity, ultraviolet rays, infrared rays, etc., and a heated thermal fluid, etc. may be used.

Next, the dried fine powder reassembly may be pulverized to have a particle diameter of about 150 μm to about 850 μm. Specific examples of a pulverizer that may be used to achieve the above particle diameter may include a pin mill, a hammer mill, a screw mill, a roll mill, a disc mill, a jog mill, etc., but the present invention is not limited to the above-described examples.

Additionally, the fine powder reassembly obtained after pulverizing may be sorted into a particle having a particle diameter of less than about 150 μm, a particle having a particle diameter of about 150 μm to about 850 μm, and a particle having a particle diameter of more than about 850 μm.

The size-sorted fine powder reassembly alone or in a mixture with other normal particles (particles having a particle diameter of 150 μm to 850 μm) may be subjected to a surface-crosslinking process.

The surface-crosslinking step is to increase a crosslinking density near the surface of the superabsorbent polymer particles in relation to a crosslinking density inside the particle. In general, a surface-crosslinking agent is applied to the surface of the superabsorbent polymer particles. Thus, this reaction is generated on the surface of the superabsorbent polymer particles, which improves crosslinkability on the surface of the particles without substantially affecting the inside of the particles. Thus, surface-crosslinked superabsorbent polymer particles have a higher crosslinking degree in the vicinity of the surface than in the inside thereof.

Here, the surface-crosslinking agent is not limited in view of constitution as long as it is a compound capable of reacting with a functional group of the polymer.

Preferably, in order to improve properties of the superabsorbent polymer to be prepared, the surface-crosslinking agent may include one or more selected from the group consisting of a polyhydric alcohol compound; an epoxy compound; a polyamine compound; a haloepoxy compound; a condensation product of a haloepoxy compound; oxazoline compounds; mono-, di- or polyoxazolidinone compound; a cyclic urea compound; a polyvalent metal salt; and an alkylene carbonate compound.

Specific examples of the polyhydric alcohol compound may include one or more selected from the group consisting of mono-, di-, tri-, tetra- or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy compound may be ethylene glycol diglycidyl ether and glycidol, etc. The polyamine compound may be one or more selected from the group consisting of ethylene diamine, diethylene triamine, triethylene tetramine, tetraethylene pentamine, pentaethylene hexamine, polyethylene imine, and polyamide polyamine.

Further, the haloepoxy compound may be epichlorohydrin, epibromohydrin, and α-methyl epichlorohydrin. Meanwhile, examples of the mono-, di- or polyoxazolidinone compound may include 2-oxazolidinone, etc.

In addition, examples of the alkylene carbonate compound may include ethylene carbonate, etc. These compounds may be used alone or in combination thereof. Meanwhile, in order to increase the efficiency of the surface crosslinking process, it is preferred to include one or more polyhydric alcohol compounds, and more preferably, polyhydric alcohol compounds having 2 to 10 carbon atoms, among the surface crosslinking agents.

The content of the surface crosslinking agent to be added may be appropriately selected depending on the kind of the surface crosslinking agent to be added or reaction conditions, but may be generally about 0.001 part by weight to 5 parts by weight, preferably about 0.01 part by weight to about 3 parts by weight, and more preferably about 0.03 parts by weight to about 2 parts by weight with respect to 100 parts by weight of the polymer.

If the content of the surface crosslinking agent is excessively small, the surface crosslinking reaction hardly occurs. If the content of the surface crosslinking agent is more than 5 parts by weight with respect to 100 parts by weight of the polymer, absorption capacity and physical properties may be deteriorated due to excessive surface crosslinking reaction.

The surface crosslinking reaction and drying may be performed at the same time by heating the polymer particles to which the surface crosslinking agent has been added.

A means for raising the temperature for surface crosslinking reaction is not particularly limited. Heating may be performed by providing a heating medium or by directly providing a heat source. In this regard, the kind of the heating medium applicable may be a hot fluid such as steam, hot air, hot oil or the like, but the present invention is not limited thereto. The temperature of the heating medium to be provided may be properly controlled, taking into consideration the means of the heating medium, the heating rate, and the target temperature. Meanwhile, as the heat source to be directly provided, an electric heater or a gas heater may be used, but the present invention is not limited to these examples.

The fine powder reassembly prepared by the above-described method includes the fiber having excellent hygroscopic property, thereby exhibiting excellent basic absorption properties while having a very excellent absorption rate. In other words, according to the present invention, since the fibers having hygroscopic property is mixed with the fine powder during the step of reassembling the fine powder, at least a portion of the fibers may be incorporated into the interior of the fine powder reassembly particle, and the fibers thus incorporated quickly absorb the surrounding moisture and transfers it to the fine powder reassembly, thereby having a remarkably improved absorption rate, as compared with a complex in which the fine powder reassembly and the fibers having hygroscopic property are simply mixed with each other.

Therefore, according to one embodiment of the present invention, provided is a superabsorbent polymer including a fine powder reassembly which is reassembled by mixing a fine powder having a particle size of less than 150 μm among polymers obtained by polymerizing a water-soluble ethylenically unsaturated monomer including acidic groups, of which at least a part is neutralized; and one or more fibers of a fluff pulp and a synthetic polymeric fiber.

In the fine powder reassembly included in the superabsorbent polymer, at least a portion of the fibers may be incorporated into the interior of the fine powder reassembly particle. In other words, the fibers are distributed in the interior and exterior of the particles of the fine powder reassembly, and quickly absorb the surrounding moisture and transfers it to the fine powder reassembly particle, thereby contributing to improvement of the absorption rate.

The fine powder reassembly may include the fiber in an amount of 1 part by weight or more, 2 parts by weight or more, or 5 parts by weight or more, and less than 20 parts by weight, 15 parts by weight or less, or 10 parts by weight or less with respect to 100 parts by weight of the fine powder. When the content of the fiber satisfies the above range, it is possible to secure improvement of the absorption rate while maintaining excellent basic absorption properties such as water retention capacity, absorbency under load, etc.

The superabsorbent polymer may have centrifugal retention capacity (CRC) in the range of about 30 g/g or more, 32 g/g or more, or about 33 g/g or more and about 45 g/g or less, about 40 g/g or less, or about 35 g/g or less, as measured in accordance with EDANA method WSP 241.3.

Further, the superabsorbent polymer may have absorbency under load (AUL) at 0.3 psi of 25 g/g or more, or 27 g/g or more, and 40 g/g or less, or 30 g/g or less, as measured in accordance with EDANA method WSP 242.3.

Further, the superabsorbent polymer may have an absorption rate (vortex time) of 60 sec or less, or 50 sec or less, as measured after adding 2 g of the superabsorbent polymer to 50 mL of physiological saline at 23° C. to 24° C., stirring a magnetic bar (diameter of 8 mm and length of 31.8 mm) at 600 rpm, and measuring a time (sec) taken for vortex to disappear. The lower absorption rate means that the superabsorbent polymer is more excellent. Therefore, the lower limit is not limited, but for example, 10 sec or more, or 20 sec or more.

Hereinafter, the present invention will be described in more detail with reference to Examples. However, the following Examples are only for illustrating the present invention, and the contents of the present invention are not limited to the following Examples. In addition, unless otherwise specified, "%" and "part" which represent the content in the following Examples and Comparative Examples are "% by weight" and "parts by weight", respectively.

EXAMPLE

Preparation Example 1

100 g of acrylic acid, 3.0 g of polyethylene glycol diacrylate (PEGDA, Mw=523) as a crosslinking agent, 0.008 g of phenylbis(2,4,6-trimethylbenzoyl)phosphine oxide as a photoinitiator, 0.08 g of sodium persulfate (SPS)

as a thermal initiator, 128 g of caustic soda (NaOH), and 63.5 g of water were mixed with each other. To this mixture, each fiber in Table 1 below was added in an amount of 5 parts by weight with respect to 100 parts by weight of a monomer composition, thereby preparing a monomer composition.

Thereafter, the monomer composition was put on a continuously moving conveyor belt and UV polymerization was allowed for 2 min by UV irradiation (UV intensity: 2 mW/cm$^2$) to obtain a water-containing gel polymer sheet.

The water-containing gel polymer sheet was cut into a size of 3 cm×3 cm, and chopped using a meat chopper (hole size of 16 mm, speed of 60 Hz) to prepare crumbs. The crumbs were dried in an oven capable of shifting airflow up and down. Specifically, the crumbs were uniformly dried by flowing hot air at 185° C. from the bottom to the top for 15 minutes and from the top to the bottom for 15 minutes, so that the dried product had a water content of 2% or less.

The dried polymer was pulverized using a pulverizer and then classified with an amplitude of 1.5 mm for 10 min (combination of meshes: #20/#30/#50/#100). Normal particles having a particle size of 150 μm to 850 μm and fine powder particles having a particle size of less than 150 μm were obtained.

Examples 1 to 9

(1) Preparation of Fine Powder Reassembly

Each fiber of Table 1 below was added in an amount as described in Table 1 with respect to 100 parts by weight of the fine powder having a particle size of less than 150 μm obtained in Preparation Example 1, and mixed with each other for 1 min. Then, 150 parts by weight of water was added and further mixed for 10 sec to prepare a fine powder reassembly.

(2) Preparation of Superabsorbent Polymer Including Fine Powder Reassembly

The water-containing gel polymer chopped using the meat chopper (hole size of 16 mm) in Preparation Example 1 and the fine powder reassembly were mixed at a weight ratio of 75:25 to obtain a coarsely pulverized water-containing gel polymer. Thereafter, drying, pulverizing, and size-sorting steps were performed in the same manner as in Preparation Example 1 to prepare a base polymer.

Thereafter, to 100 parts by weight of the prepared base polymer, a surface crosslinking solution (6.2 parts by weight of water, 6.2 parts by weight of methanol, 0.03 parts by weight of ethyleneglycol diglycidyl ether, and 0.01 part by weight of silica (Aerosil A200)) was uniformly mixed, and then subjected to a surface crosslinking reaction at 140° C. for 30 minutes. After completion of the surface treatment, a superabsorbent polymer having a mean particle diameter of 850 μm or less was obtained using a sieve.

Comparative Example 1

A superabsorbent polymer including a fine powder reassembly was prepared in the same manner as in Example 1, except that no fiber was added during preparation of the fine powder reassembly.

Comparative Example 2

A superabsorbent polymer including a fine powder reassembly was prepared in the same manner as in Example 1, except that the fluff pulp was used in an amount of 20 parts by weight with respect to 100 parts by weight of the fine powder during preparation of the fine powder reassembly.

Comparative Example 3

5 parts by weight of the fluff pulp used in Example 1 was added to 100 parts by weight of the superabsorbent polymer of Comparative Example 1, and mixed with each other to prepare a superabsorbent polymer.

Experimental Example

Physical properties were evaluated for the superabsorbent polymers prepared in Examples and Comparative Examples by the following methods, and the results are shown in Table 1.

(1) Centrifugal Retention Capacity (CRC)

The water retention capacity by absorption capacity under no load was measured for each polymer in accordance with EDANA WSP 241.3.

In detail, each of the polymers obtained in Examples and Comparative Examples was classified using a sieve of #40-50. After uniformly introducing W0 (g) (about 0.2 g) of the polymer in a nonwoven fabric-made bag and sealing the same, it was immersed in physiological saline (0.9 wt %) at room temperature. After 30 minutes, the bag was dehydrated by using a centrifuge at 250 G for 3 minutes, and then the weight W2 (g) of the bag was measured. Further, after carrying out the same operation without using the polymer, the weight W1 (g) of the bag was measured. CRC (g/g) was calculated using the obtained weights according to the following Equation:

$$CRC\ (g/g)=\{[W2\ (g)-W1\ (g)]/W0\ (g)\}-1 \qquad \text{[Equation 1]}$$

(2) Absorbency Under Load (AUL)

The absorbency under load of 0.3 psi was measured for each polymer in accordance with EDANA method WSP 242.3. When the absorbency under load was measured, the classified polymer used in the above CRC measurement was used.

In detail, a 400 mesh stainless steel net was installed in the cylindrical bottom of a plastic having an internal diameter of 25 mm. W3 (g) (0.16 g) of the superabsorbent polymer was uniformly scattered on the steel net under conditions of room temperature and relative humidity of 50%, and a piston capable of uniformly providing a load of 0.3 psi was put thereon, in which an external diameter of the piston was slightly smaller than 25 mm, there was no gap between the internal wall of the cylinder and the piston, and the jig-jog of the cylinder was not interrupted. At this time, the weight W4 (g) of the apparatus was measured.

After putting a glass filter having a diameter of 90 mm and a thickness of 5 μmm in a petri dish having a diameter of 150 mm, a physiological saline composed of 0.9% by weight of sodium chloride was poured until the surface level of the physiological saline became equal to the upper surface of the glass filter. A sheet of filter paper having a diameter of 90 mm was put thereon. The measurement apparatus was mounted on the filter paper, thereby getting the liquid absorbed under the load for 1 hour. 1 hour later, the weight W5 (g) was measured after lifting the measurement apparatus up.

Absorbency under load (g/g) was calculated using the obtained weights according to the following Equation:

$$AUP\ (g/g)=[W5\ (g)-W4\ (g)]/W3\ (g) \qquad \text{[Equation 2]}$$

(3) Absorption Rate (Vortex)

The absorption rate of each polymer was measured in seconds according to the method described in International Publication WO 1987-003208.

In detail, 2 g of the superabsorbent polymer was added to 50 mL of physiological saline at 23° C. to 24° C., and stirred with a magnetic bar (diameter of 8 mm and length of 31.8 mm) at 600 rpm, and a time taken for vortex to disappear was measured in seconds to calculate the absorption rate (vortex time).

TABLE 1

|  | Fiber | | | | Physical properties of superabsorbent polymer | | |
| --- | --- | --- | --- | --- | --- | --- | --- |
|  | Kind | Width (μm) | Mean length* (mm) | Content (parts by weight) | CRC (g/g) | 0.3 psi AUL (g/g) | Vortex (sec) |
| Example 1 | Fluff pulp | 30-50 | 8 | 1.0 | 34.0 | 27.9 | 51 |
| Example 2 | Fluff pulp | 30-50 | 8 | 3.0 | 33.3 | 27.6 | 48 |
| Example 3 | Fluff pulp | 30-50 | 8 | 5.0 | 32.1 | 27.5 | 47 |
| Example 4 | Fluff pulp | 30-50 | 8 | 7.5 | 30.9 | 27.3 | 42 |
| Example 5 | Fluff pulp | 30-50 | 8 | 10 | 30.1 | 27.0 | 39 |
| Example 6 | Fluff pulp | 10-20 | 4 | 5.0 | 32.6 | 27.6 | 46 |
| Example 7 | PP | 20-25 | 3 | 5.0 | 33.1 | 27.6 | 45 |
| Example 8 | PVA | 10-15 | 6 | 5.0 | 32.8 | 27.5 | 48 |
| Example 9 | Nylon | 10-15 | 3 | 5.0 | 32.9 | 27.5 | 46 |
| Comparative Example 1 | — |  |  | 0 | 34.0 | 28.0 | 69 |
| Comparative Example 2 | Fluff pulp | 30-50 | 8 | 20 | 28.0 | 24.0 | 36 |
| Comparative Example 3 | (fine powder reassembly after preparation was simply mixed with pulp of Example 1) | | | 5.0 | 31.8 | 23.1 | 72 |

*The mean length of the fiber was obtained by randomly selecting 100 fibers and then calculating the mean value of the lengths thereof.

Referring to Table 1, it was confirmed that the superabsorbent polymers prepared according to the present invention have excellent basic physical properties such as CRC, AUL, etc. while exhibiting a remarkably improved absorption rate, as compared with Comparative Example 1 including no fiber and Comparative Example 3 in which the fiber was simply mixed. However, it was confirmed in Comparative Example 2 that when the content of fluff pulp was too high, the absorption rate was improved, but basic physical properties such as CRC, AUL, etc. were deteriorated.

The invention claimed is:

1. A method of preparing a fine powder reassembly, the method comprising:
   performing thermal polymerization or photo-polymerization of a monomer composition including a water-soluble ethylenically unsaturated monomer and a polymerization initiator to prepare a water-containing gel polymer;
   drying, pulverizing, and size-sorting the water-containing gel polymer to classify the water-containing gel polymer into a fine powder having a particle size of less than 150 μm and a normal particle having a particle size of 150 μm to 850 μm;
   mixing a fiber of a fluff pulp and a synthetic polymeric fiber with the fine powder and water to prepare a fine powder aqueous solution, wherein the fine powder aqueous solution includes the fiber in an amount of 1 part by weight or more to less than 20 parts by weight with respect to 100 parts by weight of the fine powder; and
   stirring the fine powder aqueous solution to prepare the fine powder reassembly, wherein the fiber has a width of 1 μm to 80 μm.

2. The method of preparing a fine powder reassembly of claim 1, wherein the fiber has a length of 1 mm to 20 mm.

3. The method of preparing a fine powder reassembly of claim 1, wherein the synthetic polymeric fiber is one or more selected from the group consisting of nylon, polypropylene, polyethylene, polyester, polyacrylonitrile, polyvinyl chloride, polyvinyl alcohol, polyacrylate, and acetate.

4. The method of preparing a fine powder reassembly of claim 1, wherein the fine powder aqueous solution includes water in an amount of 50 parts by weight to 150 parts by weight with respect to 100 parts by weight of the fine powder.

5. A method of preparing a superabsorbent polymer comprising the method of preparing a fine powder reassembly of claim 1, further comprising drying, pulverizing, and size-sorting the fine powder reassembly to obtain the superabsorbent polymer having a particle size of 150 μm to 850 μm.

6. The method of preparing a superabsorbent polymer of claim 5, further comprising surface-crosslinking the superabsorbent polymer having the particle size of 150 μm to 850 μm to obtain a surface-crosslinked superabsorbent polymer.

* * * * *